J. CROSBY.
Curd Cutter.
No. 41,833.
Patented March 8, 1864.
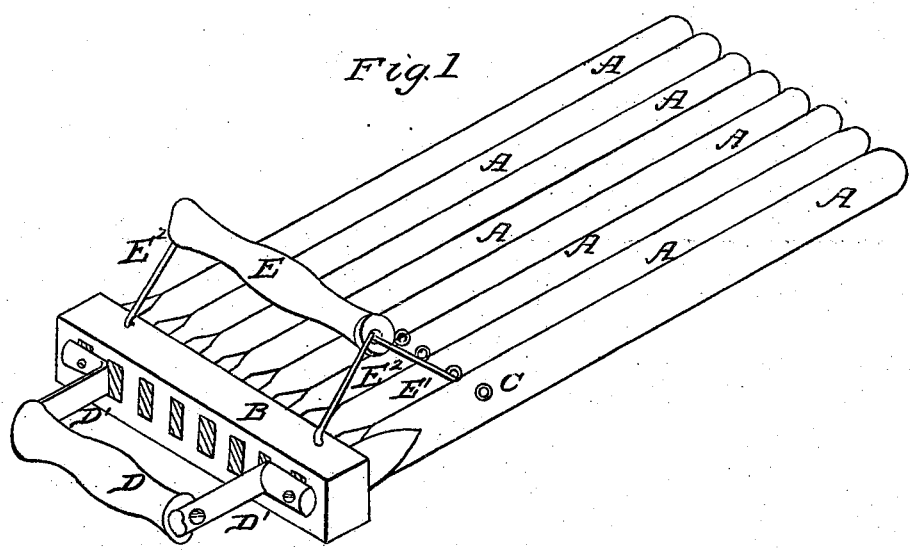
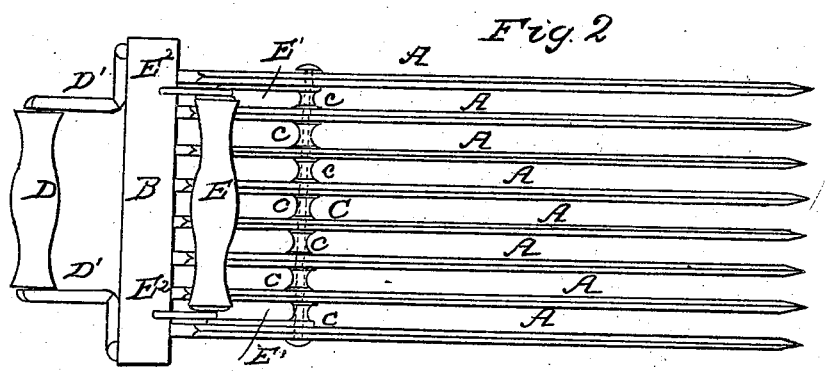

UNITED STATES PATENT OFFICE.

JOSIAH CROSBY, OF ROME, NEW YORK.

IMPROVEMENT IN CURD-CUTTERS.

Specification forming part of Letters Patent No. 41,833, dated March 8, 1864.

*To all whom it may concern:*

Be it known that I, JOSIAH CROSBY, of Rome, in the county of Oneida and State of New York, have invented a new and Improved Curd Cutter and Worker; and I do hereby declare the following to be a full and exact description of the same, reference being had to the accompanying drawings, making part of this specification, in which—

Figure 1 is a perspective view of my invention. Fig. 2 is a plan of the same.

Similar letters of reference indicate corresponding parts in the two figures.

The subject of my invention is a device for separating curd into small particles to facilitate the treatment which it undergoes in being converted into cheese, and also for separating or pressing the whey from said curd; and the invention consists in a peculiar arrangement of handles employed in connection with a series of parallel knives, whereby the implement may be operated with great facility, as will be hereinafter explained.

In order that others skilled in the art to which my invention appertains may be enabled to fully understand and use the same, I will proceed to describe it, with reference to the accompanying drawings.

A A represent a series of knives, the ends of which are tenoned and secured in corresponding mortises in the end piece or bar, B.

C represents a rod passing transversely through the entire series of knives A, and riveted therein, so as to prevent the lateral displacement of the outer knives. This rod C may be situated at any suitable distance from the end piece, B, and is designed to constitute a brace for the knives A, for which purpose, on each side of the respective knives A, the bar is provided with collars $a$, as shown in Fig. 2.

D represents a handle pivoted in metallic arms D' D', which are rigidly attached to the end piece, B. E represents a handle mounted on a rod, E', which braces and is braced by rods $E^2$ $E^2$. It will at once be seen that these brace-rods adapt the handle E to withstand any strain to which it may be subjected while the implement is in use.

The operator, by grasping each handle D E, is thereby enabled to operate the knives with facility to hash or cut the curd into small pieces with great expedition, and also to effectually stir or work the same in order to cause the whey to pass off through perforations in the vat in which the curd may be placed.

This invention is of simple and cheap construction, and constitutes a much-needed acquisition to the art in which implements of this character are necessarily employed.

Having thus described my invention, the following is what I claim as new therein, and desire to secure by Letters Patent:

As a new article of manufacture, a curd cutter and worker consisting of a series of knives, A A, handles D E, and rod C, all constructed and arranged as herein shown and described.

JOSIAH CROSBY.

Witnesses:
    ANSEL HUNTINGTON,
    SAMUEL A. WRIGHT.